US011650997B2

(12) United States Patent
Sandu et al.

(10) Patent No.: US 11,650,997 B2
(45) Date of Patent: *May 16, 2023

(54) CONTEXTUAL INSIGHT SYSTEM

(71) Applicant: Microsoft Technology Licensing, LLC, Redmond, WA (US)

(72) Inventors: Andreea Sandu, Oslo (NO); Mihai Gramada, Amsterdam (NL); Dorin Adrian Rusu, Oslo (NO); Gabriel Alexandru Badescu, Oslo (NO); Ion Morozan, Oslo (NO); Monica Cristiana Iacob, Oslo (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/464,497

(22) Filed: Sep. 1, 2021

(65) Prior Publication Data
US 2021/0397624 A1  Dec. 23, 2021

Related U.S. Application Data

(63) Continuation of application No. 15/395,614, filed on Dec. 30, 2016, now Pat. No. 11,138,208.

(51) Int. Cl.
*G06F 16/2457* (2019.01)
*G06F 16/93* (2019.01)
*G06F 16/951* (2019.01)
*G06F 16/33* (2019.01)

(52) U.S. Cl.
CPC .. *G06F 16/24575* (2019.01); *G06F 16/24578* (2019.01); *G06F 16/3338* (2019.01); *G06F 16/93* (2019.01); *G06F 16/951* (2019.01)

(58) Field of Classification Search
None
See application file for complete search history.

(56) References Cited

U.S. PATENT DOCUMENTS

2016/0048772 A1* 2/2016 Bruno ............... G06N 5/04 706/11
2016/0371259 A1* 12/2016 Kohlmeier ........ G06Q 10/10

FOREIGN PATENT DOCUMENTS

CN          105612517 A      5/2016

OTHER PUBLICATIONS

"Office Action Issued in Indian Patent Application No. 201947024466", dated Dec. 13, 2021, 7 Pages.
"First Office Action and Search Report Issued in Chinese Patent Application No. 201780081353.0", dated Nov. 24, 2022, 12 Pages.

* cited by examiner

*Primary Examiner* — Giuseppi Giuliani

(57) ABSTRACT

Aspects of systems and methods for providing contextual and event driven insights are provided. The system monitors information about the users and their conversations. Upon receiving a natural language request for information for a topic, the system utilizes a model to extract one or more topics from the request. The system utilizes the topic to query a resource for candidate users with knowledge about the topic. The system then queries a resource to identify candidate content items associated with the topic and the candidate users. Thereafter, the system refines the candidate users and the candidate content items to identify relevant users and content items that are meaningful to the user.

20 Claims, 11 Drawing Sheets

CONTEXTUAL INSIGHT SYSTEM

CROSS REFERENCE TO RELATED APPLICATION

This application is a continuation of U.S. application Ser. No. 15/395,614, filed Dec. 30, 2016, now U.S. Pat. No. 11,138,208 which application is incorporated herein by reference in its entirety.

BACKGROUND

A person typically has one or more tasks to perform throughout their day. However, some of these tasks may be new or unfamiliar to the person. As a result, the person must seek out information about a topic associated with the task or information for completing the task. For example, the person may research information about the task or topic via a search engine. The person must then filter through the voluminous search results for information relevant to the task. Alternatively, the person may seek out people that may have information regarding the task. However, the person may be unable to identify which people have relevant information about the task. Consequently, manually performing the research for relevant information and people can be extremely time-consuming and daunting for the person.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Aspects of systems and methods for providing contextual and event driven insights are disclosed herein. Information about the users and their conversations is monitored, which includes static and dynamic context data about the users. The static context data includes data about the users that generally does not change within a timeframe, which may include user name, title, department, number of years with the company, etc. The dynamic context data includes data about the users that generally changes during a timeframe, which may include topics and people in a conversation. Upon receiving a natural language request for information for a topic, a model is utilized to extract one or more topics from the request. The topic is utilized to query a resource for candidate users with knowledge about the topic. A resource is then queried to identify candidate content items associated with the topic and the candidate users. Thereafter, the candidate users and the candidate content items are refined to identify relevant users and content items that are meaningful to the user.

Accordingly, the systems and methods for providing contextual and event driven insights optimize the identification, retrieval, and display of relevant information relating to a topic. Further, the systems and methods improve efficiency of identifying the users and the content items and relevancy of the users and the content items in the results, which conserves computing resources.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
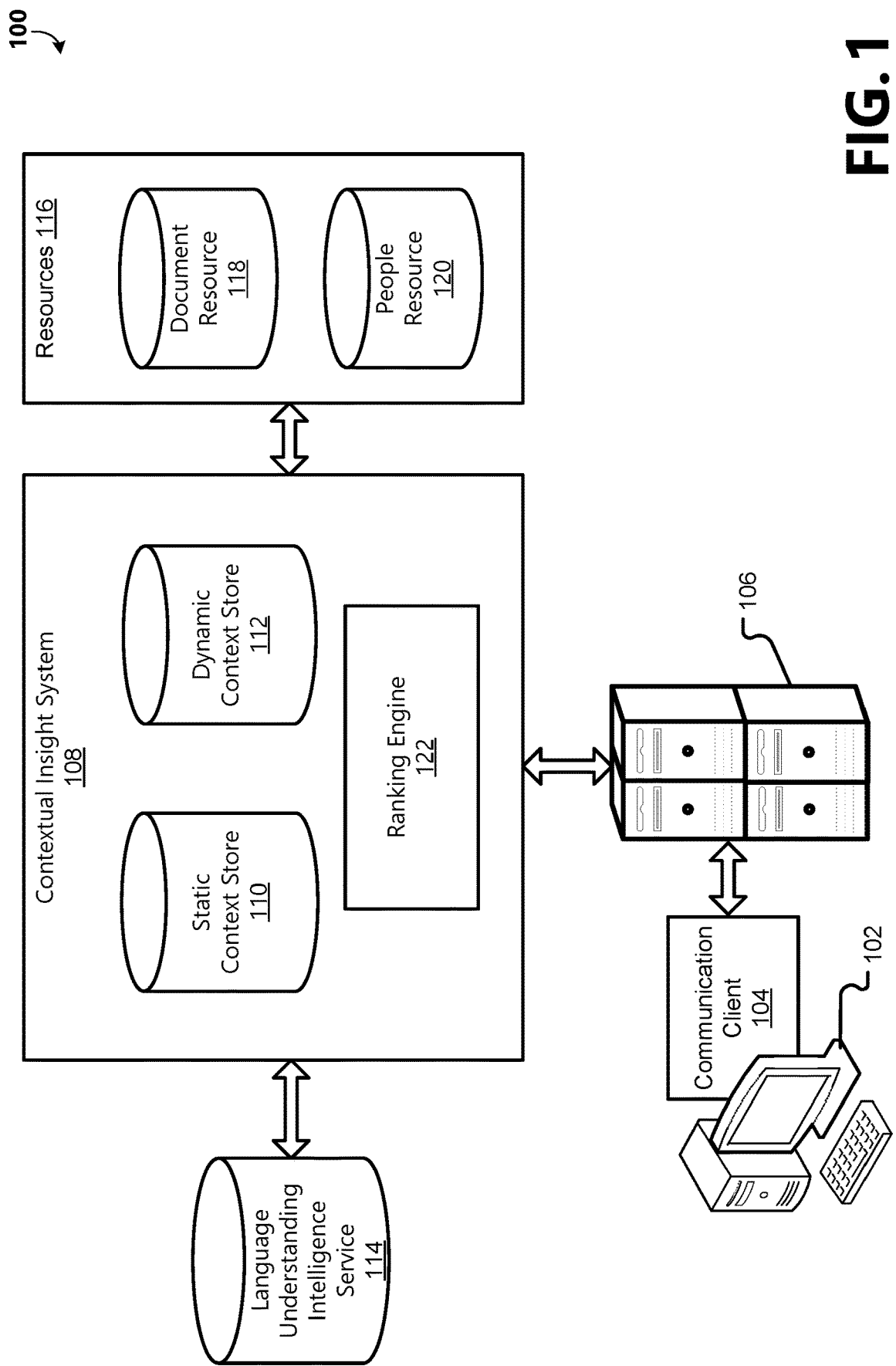
FIG. 1 is a block diagram of a system for providing a contextual insight system.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of systems and methods for providing contextual and event driven insights are discussed herein. Information about the users and their conversations is monitored, which includes static and dynamic context data about the users. The static context data includes data about the users that generally does not change within a timeframe, which may include user name, title, department, number of years with the company, etc. The dynamic context data includes data about the users that generally changes during a timeframe, which may include topics and people in a conversation. Upon receiving a natural language request for information for a topic, a model is utilized to extract one or more topics from the request. The system utilizes the topic to query a resource for candidate users with knowledge about the topic. A resource is then queried to identify candidate content items associated with the topic and the candidate users. Thereafter, the candidate users and the candidate content items are refined to identify relevant users and content items that are meaningful to the user.

Accordingly, the systems and methods for providing contextual and event driven insights optimize the identification, retrieval, and display of relevant information relating to a topic. Further, the systems and methods improve efficiency of identifying the users and the content items and relevancy of the users and the content items in the results, which conserves computing resources.

FIG. 1 is a block diagram of an example environment 100 for providing a Contextual Insight System 108. An environment 100, as illustrated, includes a computing device 102, running a communication client 104, which communicates with the communication server 106 to send and receive communications. Various servers and intermediaries may lie between the computing device 102 and the communication server 106 to route the communications between the sender and the recipient. The communication server 106 is an application or service which is able to provide messaging communications including, without limitation, telecommunications and voice over internet protocol (VOIP) platforms, for example FACEBOOK® MESSENGER (offered by Facebook, Inc. of Menlo Park, Calif.), GOOGLE CHAT™ (offered by Alphabet, Inc. of Mountain View, Calif.), YAHOO!® MESSENGER (offered by Yahoo, Inc. of Sunnyvale, Calif.), and SKYPE® (offered by Microsoft of Redmond, Wash.).

The communication server 106 is in communication with a contextual insight system 108 to provide contextual and event driven insights. In one example, the contextual insight system 108 includes an insight agent that is configured to connect to a communication. In one example, the insight agent is provided as a participant to the communication, such as a meeting. Further, because implementations of the contextual insight system 108 may access secure and/or sensitive information within a computing system, the contextual insight system 108 is configured to utilize an authentication framework to establish a secure connection. In one example, the contextual insight system 108 utilizes a two factor authentication which utilizes a first authentication factor, such as user credentials, and a second authentication factor, such as verification via a secondary computing device. Upon successful authentication, a trusted relationship is established between the user, the contextual insights system 108, and the company resources (e.g., company domain or intranet). It should be recognized that there are numerous benefits associated with establishing a trusted relationship between the user, the contextual insights system 108, and the company resources, including improving the relevancy of data collected through the incorporation of relevant company resources and improving the accuracy of contextual and event driven insights through the use of data collected from a verifiable company resource.

According to one aspect, the contextual insight system 108 is operable to capture various data from the communications. In one example, the contextual insight system 108 is operable to capture static context data relating to the participants in a communication, which is cached in a static context store 110. Generally, the static context data includes data about the participants that does not change over a timeframe, such as the duration of a communication. The static context data are representative of data including, without limitation, user name, title, department, number of years with the company, etc. In another example, the contextual insight system 108 is operable to capture dynamic context data relating to the subject matter discussed in the communications, which is cached in a dynamic context store 112. Generally, the dynamic context data includes data about the subject matter of the conversations that may frequently change during a timeframe, such as a specified number of previous communications. The dynamic context data are representative of data including, without limitation, topics and people discussed or mentioned in the user's recent conversations.

The contextual insight system 108 is operable to communicate with the user via the communication client. In one aspect, the contextual insight system 108 receives a user request for information on a topic from the communication client 104. In one example, the contextual insight system 108 is in communication with a Language Understanding Intelligence Service 114 to process the natural language request from the user. Specifically, the contextual insight system 108 utilizes the Language Understanding Intelligence Service 114 to analyze and extract keywords from the user request. As can be appreciated, the Language Understanding Intelligence Service 114 may also provide data concerning a user's intent and context to the contextual insight system 108. Further, in one aspect, the data extracted from the Language Understanding Intelligence Service 114 is added to the dynamic context store 118.

The contextual insight system 108 is further in communication with various resources 116 to process the user's request. Specifically, the contextual insight system 108 utilizes various resources 116 to perform a query to identify relevant information. In one aspect, as illustrated in FIG. 1, the resources 116 include a document resource 118 and a people resource 120. The document resource 118 includes, without limitation, document databases, document management systems, an information management index and repository service, or other systems for managing documents. The people resource 120 includes, without limitation, databases, enterprise directories, social networks, or other systems for providing a collection of users. In one aspect, the document resource 118 and people resource 120 are embodied in a relational graph. A relational graph maintains several entities as nodes and the relationships between those nodes as edges connecting related nodes. For example, entities represented as nodes include documents, meetings, communication, etc., and edges representing relations among these entities, such as an edge between a person node and a document node representing that person's authorship, modification, or view of the document. In response to querying the resources 116 based on keywords extracted from the user's request, the contextual insight system 108 is operable to identify several candidate users and candidate documents that are responsive to the request.

Further, the contextual insight system 108 utilizes a ranking engine 122 to identify the relevant users and relevant documents. In one example, the ranking engine 122 ranks the candidate users and candidate documents identified in the document resource 118 and the people resource 120 to identify top results that are most meaningful to the requesting user.

Figure 2:
FIG. 2 is an illustration of an example graphical user interface in which a contextual insight system is implemented.

FIG. 2 is an illustration of an example graphical user interface 200 in which a contextual insight system 108 is implemented. With reference to the communication illustrated in FIG. 2, the contextual insight system 108 monitors and captures data from the communication. According to one aspect, the contextual insight system 108 captures static context data, including information relating to the participants in the communication. In the illustrated example, the static context data may include "Erica Jones," "Software Development Manager," or other data about the participants that is generally unchanged over the duration of the communication. According to another aspect, the contextual insight system 108 captures dynamic context data, including information relating to the participants and subject matter discussed in the communications. In the illustrated example, the dynamic context data may include "Erica Jones," "XYZ Marketing project," "Barbara Harriman," "Mrs. Letsinger," or other data about the participants or topics discussed during the communication. Further, the contextual insight system 108 may monitor and capture the data based on system constraints. In one example, the contextual insight system 108 may monitor and capture the data in response to receiving a query, i.e., the data is retrieved on demand, or the data may be captured and stored in persistent storage, or temporary storage, such as the static context store 110 and dynamic context store 112.

FIGS. 3A, 3B, 3C, and 3D are illustrations of an example graphical user interface in which a contextual insight system 108 is implemented.

Figure 3A:
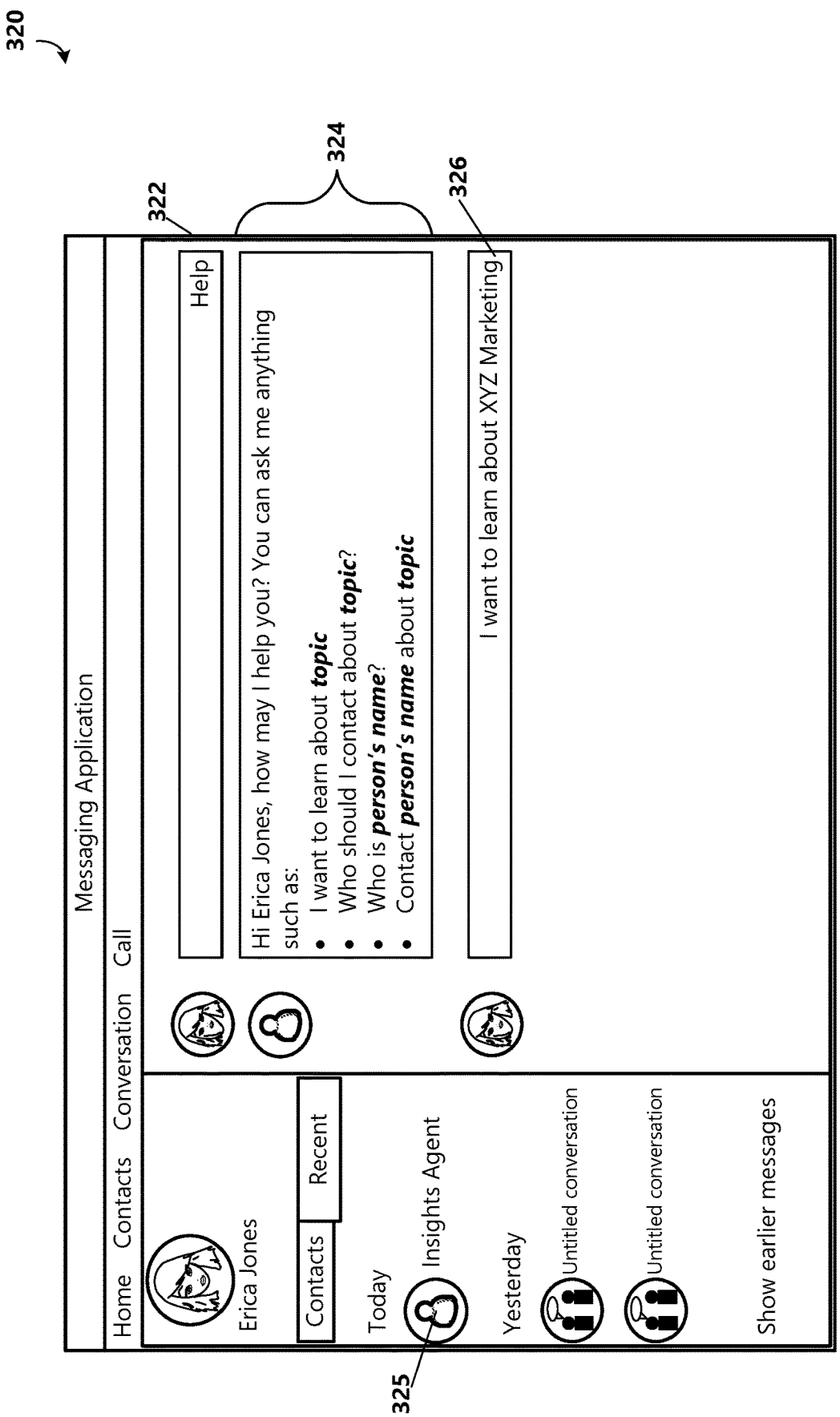
FIGS. 3A, 3B, 3C, and 3D are illustrations of an example graphical user interface in which a contextual insight system is implemented.

As illustrated in the example graphical user interface 320 in FIG. 3A, the contextual insight system 108 is operable to be incorporated into the features of the messaging application. According to one aspect, the contextual insight system 108 may utilize an insights agent 325 that is a participant in a communication. In one example, as illustrated, the user sends a request 326 to the insights agent 325 via the messaging application. The contextual insight system 108 is operable to receive the user's natural language query received via the insights agent 325 and parse it via a natural language processor, such as the Language Understanding Intelligence Service 114. The system utilizes the Language Understanding Intelligence Service 114 to identify keywords within the user's request, which are used to query the resource 116, such as the people resource 120 and the document resource 118, for relevant information about the topic of the user's request.

The insights agent 325 may also provide various support functionality. For example, in the illustrated example in FIG. 3A the user has submitted a request 322 for "Help." In response, the insights agent 325 responds to the user request with a message 324 to assist the user in sending a query to request information. The user is able to utilize the examples provide in the message 324 to formulate an appropriate request for the insights agent 325. In the illustrated example, the user submits a new request 326 that states "I want to learn about XYZ Marketing."

Figure 3B:
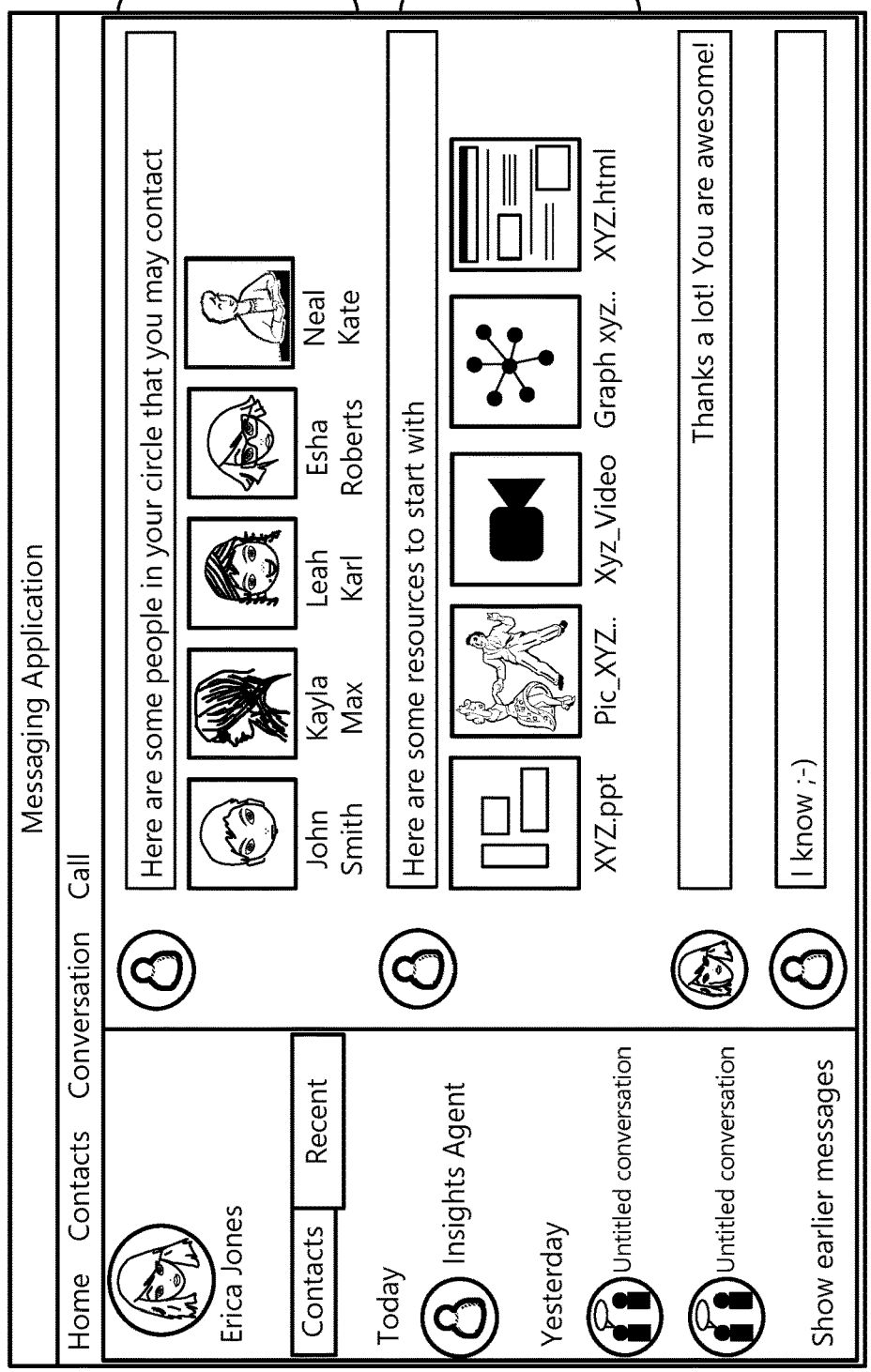

According to aspects, as illustrated in the example graphical user interface 340 in FIG. 3B, the contextual insight system 108 is operable to provide the user with the relevant information via the insights agent 325 within the messaging application. The relevant information may include relevant people and/or relevant documents responsive to the user's request. For example, in response to the user request 326 in FIG. 3A, the contextual insight system 108 is operable to query the resources 116 and identify the most relevant people 344, associated with "XYZ Marketing" and documents 346 that are meaningful to the user. Thereafter, the insights agent 325 responds to the request 326 for information about "XYZ Marketing" by providing the most relevant people 344 associated with "XYZ Marketing" and relevant documents 346.

Figure 3C:
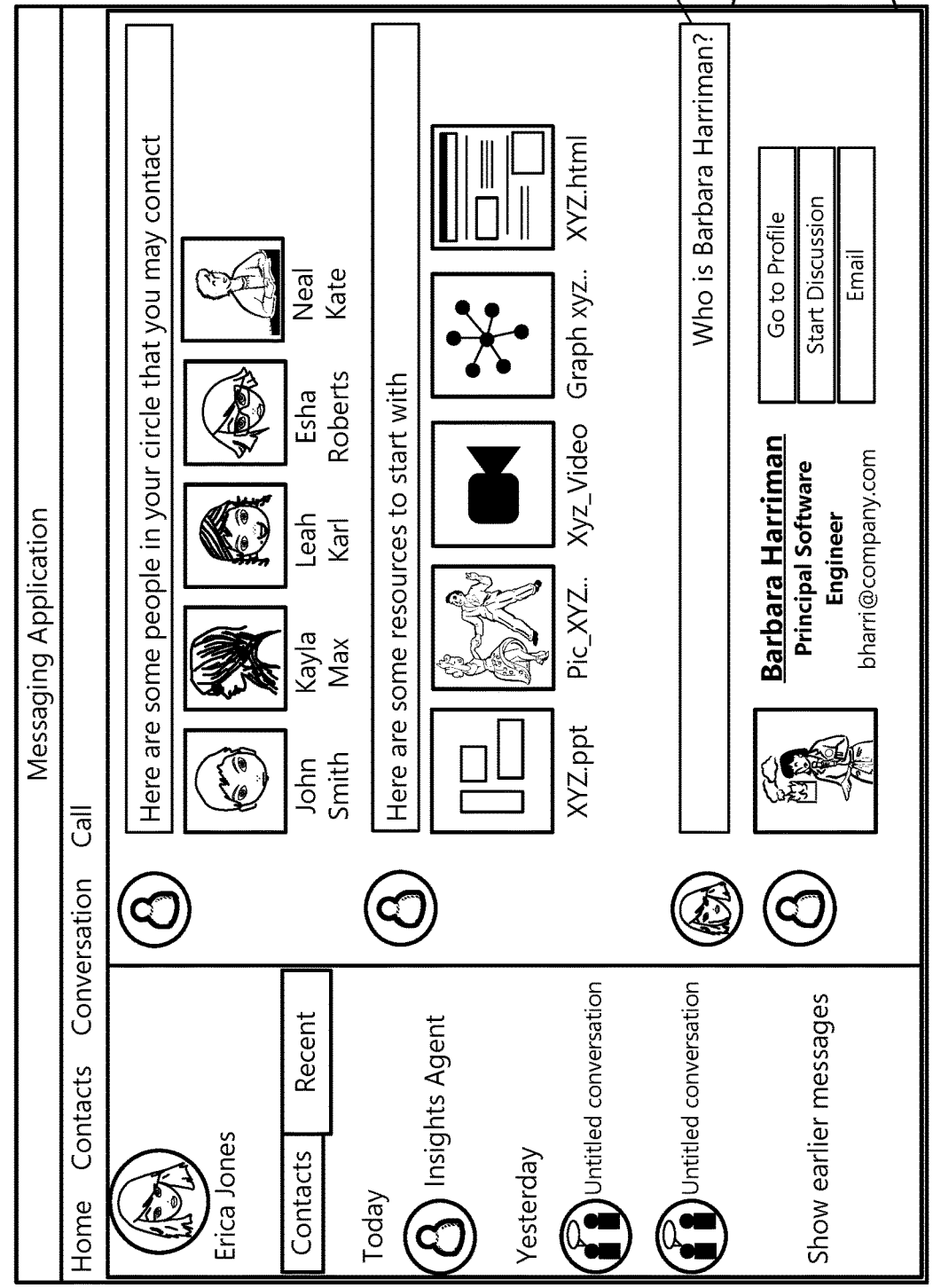

FIG. 3C is an illustration of an example graphical user interface 360 in which a subsequent query can be received by the contextual insight system 108. For example, upon receiving the relevant people 344 and the relevant documents 346 as illustrated in FIG. 3B, the user may submit a subsequent query 362 requesting additional information about a person. The contextual insight system 108 provides relevant information in response to the subsequent query by providing the contact information 364. In the example illustrated in FIG. 3C, the contact information includes a brief description, title, email, a selectable user interface to visit the person's profile, a selectable user interface to start a discussion an application, and a selectable user interface to send an electronic mail.

Figure 3D:
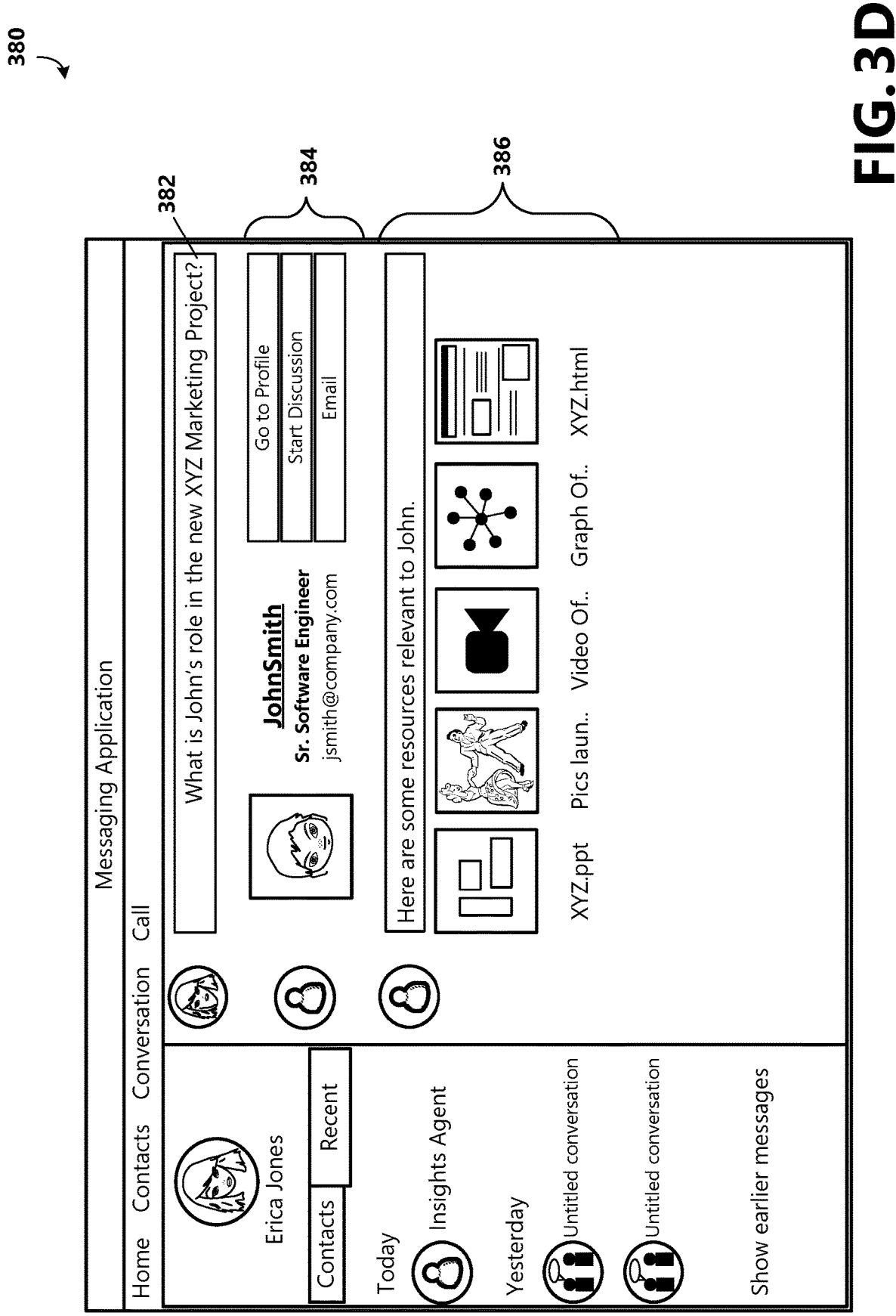

FIG. 3D is an illustration of an example graphical user interface 380 in which a query can be received by the contextual insight system 108. The contextual insight system 108 is operable to analyze and extract keywords from the request. As illustrated in FIG. 3C, the request 382 requests information relating to "John's role" in the "new XYZ Marketing project." Accordingly, the contextual insight system 108 is operable to perform a Boolean query of the resources 116 to provide relevant meaningful results to the user.

In the example illustrated in FIG. 3D, the insights agent 325 responds with the relevant person 384, namely "John Smith," and the relevant documents 386 authored, interacted with, or reviewed by "John Smith." More specifically, the insights agent 325 provides contact information 384 for "John Smith" including a brief description, title, email, a selectable user interface to visit the person's profile, a selectable user interface to start a discussion an application, and a selectable user interface to send an electronic mail.

Figure 4:
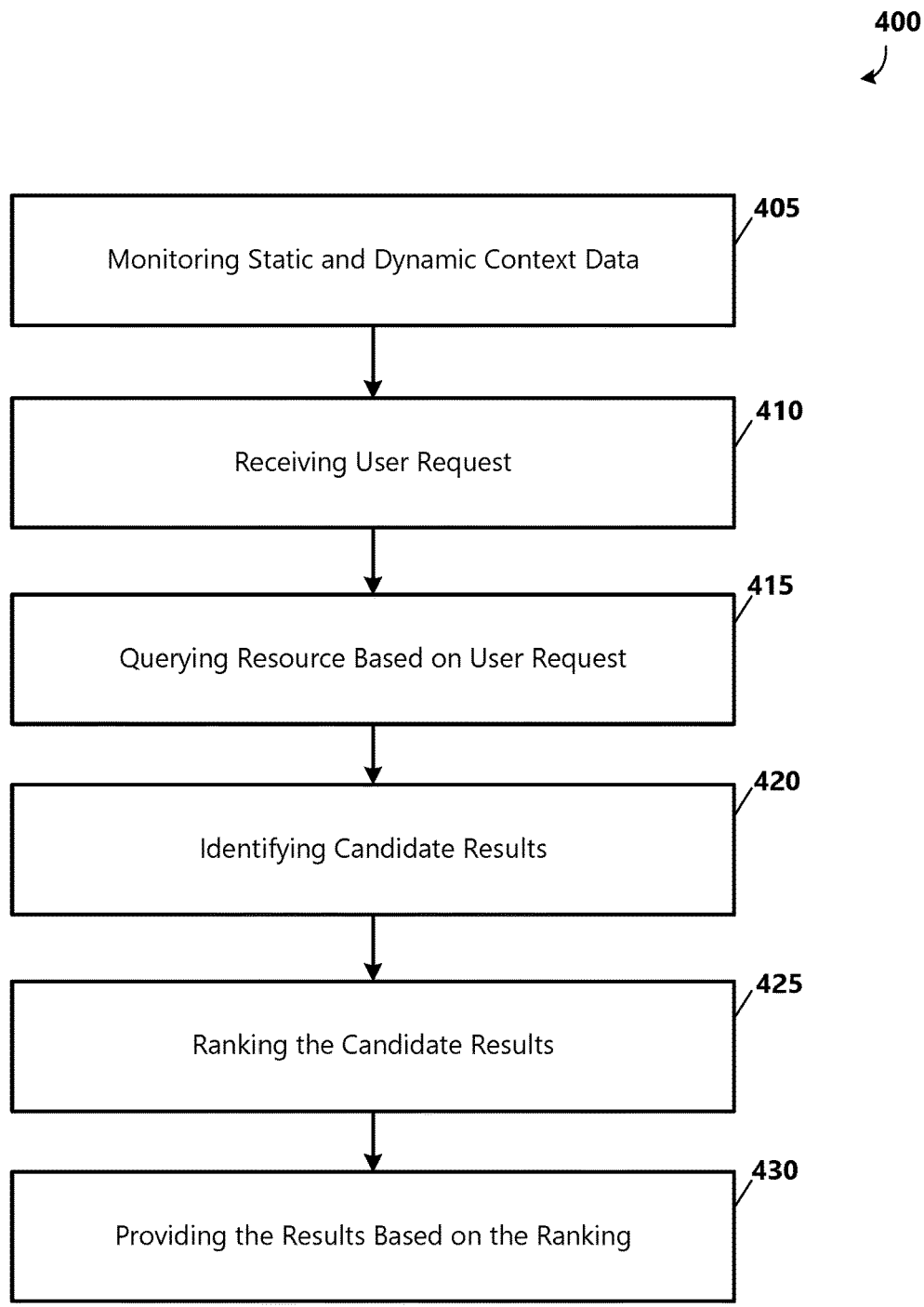
FIG. 4 is a flow chart showing general stages involved in an example method for providing a contextual insight system.

FIG. 4 is a flow chart showing general stages involved in an example method for providing a contextual insight system 108.

As illustrated in FIG. 4, method 400 begins with OPERATION 405, where the contextual insight system 108 monitors communications for various data. According to one aspect, the contextual insight system 108 is operable to capture static context data and dynamic context data. In one example, the contextual insight system 108 captures static context data that relates to the participants in a communication. The static context data includes data concerning the participants that generally does not change during the communication, including, without limitation, user name, title, department, number of years with the company, etc. In another example, the contextual insight system 108 captures dynamic context data that relates to the topics discussed in the communications. The dynamic context data includes data about the subject matter of the conversations that may frequently change. Accordingly, the contextual insight system 108 may identify a relevant timeframe for monitoring the dynamic context data, such as the previous five messages associated with a communication, the previous ten messages associated with a communication, all of the previous messages associated with a communication, or a specified number of previous communications.

The method 400 proceeds to OPERATION 410, where the contextual insight system 108 receives a user request for information. In one aspect, the system utilizes an insights agent 325 to receive the request from the user. For example, the user sends a message requesting information to the insights agent as illustrated in FIGS. 3A-3D. Further, the insights agent 325 may receive a natural language request from the user. As a result, the contextual insight system 108 may utilize a natural language processor, such as the Language Understanding Intelligence Service 114 to analyze and extract keywords from the request. For example, a natural language request "tell me more about XYZ Marketing" is analyzed by the contextual insight system 108 to identify keywords such as "XYZ Marketing." Further, if the keyword identified from the request has more than one meaning, the static and/or dynamic context data may be used to identify the correct interpretation of the identified keyword. According to another aspect, the contextual insight system 108 may provide an option to request for more information about a topic based on user activity. For example, if the user enters "XYZ project" in the communication, the contextual insight system 108 identifies the context and prompts the user whether the user would like to receive additional information about "XYZ project".

The method 400 proceeds to OPERATION 415, where the contextual insight system 108 queries one or more resources 116 for relevant information. According to one aspect, the contextual insight system 108 queries the resources 116 for relevant information relating to the keywords extracted in OPERATION 410.

The method 400 then proceeds to OPERATION 420, where candidate results are identified from OPERATION 415. In one example, in response to querying the people resource 120, the contextual insight system 108 identifies candidate users that are relevant to the topic of the request. Based on the candidate users, the contextual insight system 108 identifies candidate content items associated with the topic and the candidate users from the document resource 118.

The method 400 then proceeds to OPERATION 425, where identified candidate results are ranked. The ranking is based on a relevancy score assigned to each identified candidate result. In one aspect, the relevancy score is assigned to a candidate result based on the static and the dynamic context data built by the system.

Example ranking formulas are shown below in FORMULAS 1-2 are applied to the candidate results to improve the relevancy of the results. More particularly, example FORMULA 1 is applied to the candidate users to improve the relevancy of the user results.

$$P\text{score}_i = S_{Pi} + x*\text{Level}_i + y*\text{Role}_i + z*\text{Alias}_i \quad \text{FORMULA 1:}$$

In FORMULA 1, the term $P\text{score}_i$ represents the refined ranking score for user i, the term $S_{Pi}$ represents the user ranking score from people service provider for user i, the term $L_{cu}$ represents the central user level, the term $L_i$ represents the level of user i, the term $R_{cu}$ represents the central user role, the term $R_i$ represents the role of user i, the term $\text{Alias}_i$ represents the alias of user i, and the term $S_{pc}$ represents trending people and participants from static context data. Further, the FORMULA 1 is performed based on the constraints that $\text{Level}_i$ equates to 1 when $|L_{cu}-L_i|<3$ and 0 otherwise, $\text{Role}_i$ equates to 1 when $R_{cu}=R_i$ and 0 otherwise, and $\text{Alias}_i$ equates to 1 for $A_i \in S_{Pc}$ and 0 otherwise. Further, the elements in FORMULA 1 are weighted based on the equations: $x=0.2*\text{Med}_i$ and $y=0.3*\text{Med}_i$ and $z=0.5*\text{Med}_i$, where $\text{Med}_i=\text{Median}(S_{Pi})/N_{rp}$, and the term $N_{rp}$ is defined by the number of users.

More particularly, example FORMULA 2 is applied to the candidate documents to improve the relevancy of the document results.

$$D\text{score}_i = S_{Di} + a*D_{Sc} + b*Au_i + c*\text{Mod}_i \quad \text{FORMULA 2:}$$

In FORMULA 2, the term $D\text{score}_i$ represents the refined ranking score for document i, the term $S_{Di}$ represents the user ranking score from document service provider for document i, the term $S_{Dc}$ represents the trending documents from static context data, the term $Au_i$ represents the author of document i, the term $\text{Mod}_i$ represents the last modified date for document i, and the term LQ represents the last quarter or the previous three months. Further, FORMULA 2 is performed based on the constraints that $D_{Sc}$ equates to 1 when $D_i \in S_{Dc}$ and 0 otherwise, $Au_i$ equates to 1 when $Au_i \in S_{Dc}$ and 0 otherwise, and $\text{Mod}_i$ equates to 1 for $\text{Mod}_i \in LQ$ and 0 otherwise. Further, the weighting of the elements in FORMULA 2 are based on a=0.5 and b=0.3 and c=0.2.

The method 400 then proceeds to OPERATION 430, where the contextual insight system 108 provides the results based on the ranking. In one aspect, the contextual insight system 108 provides a selected number of the ranked results to the user. For example, the contextual insight system 108 may provide the top five results with the highest ranks.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
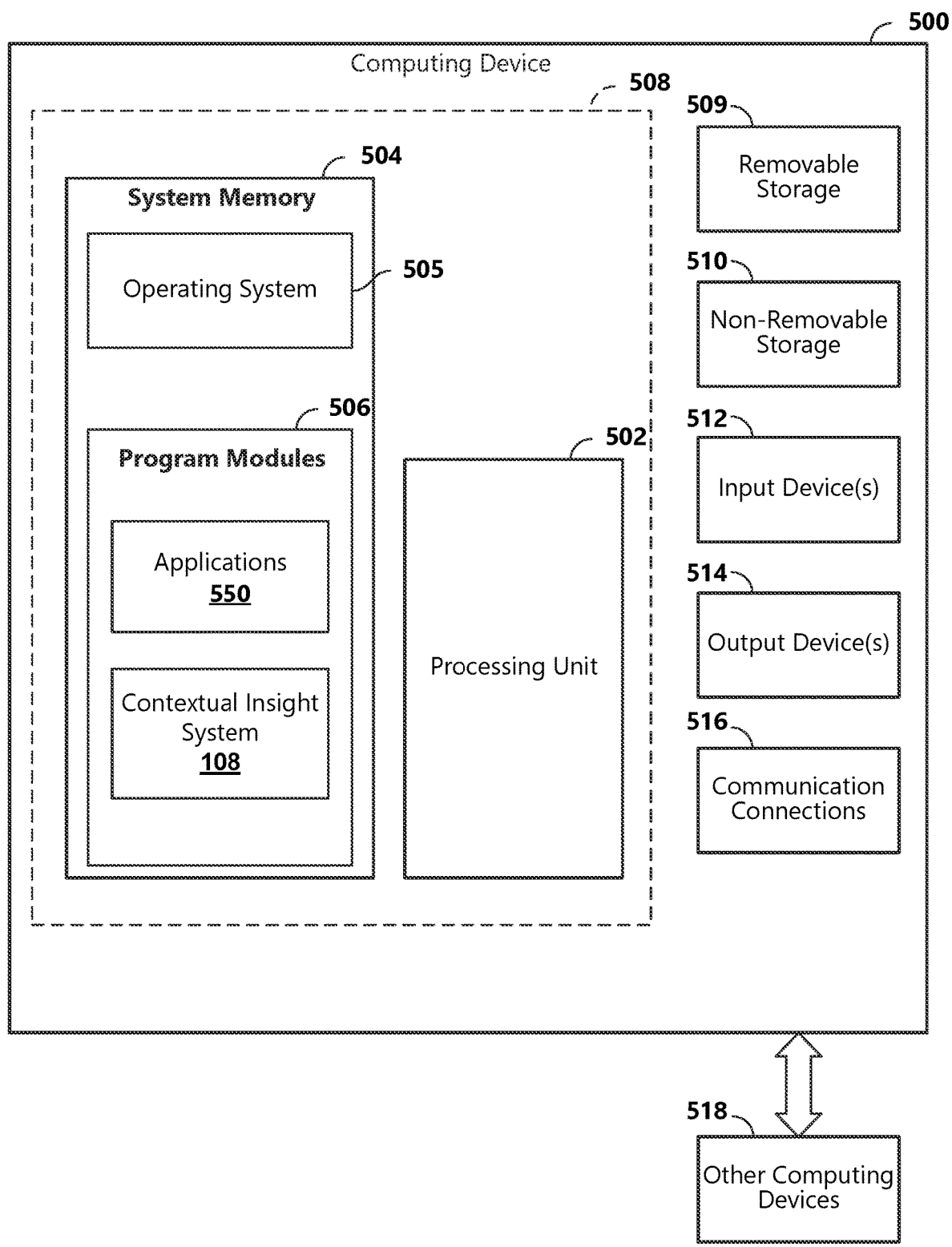
FIG. 5 is a block diagram illustrating example physical components of a computing device.
Figure 6A:
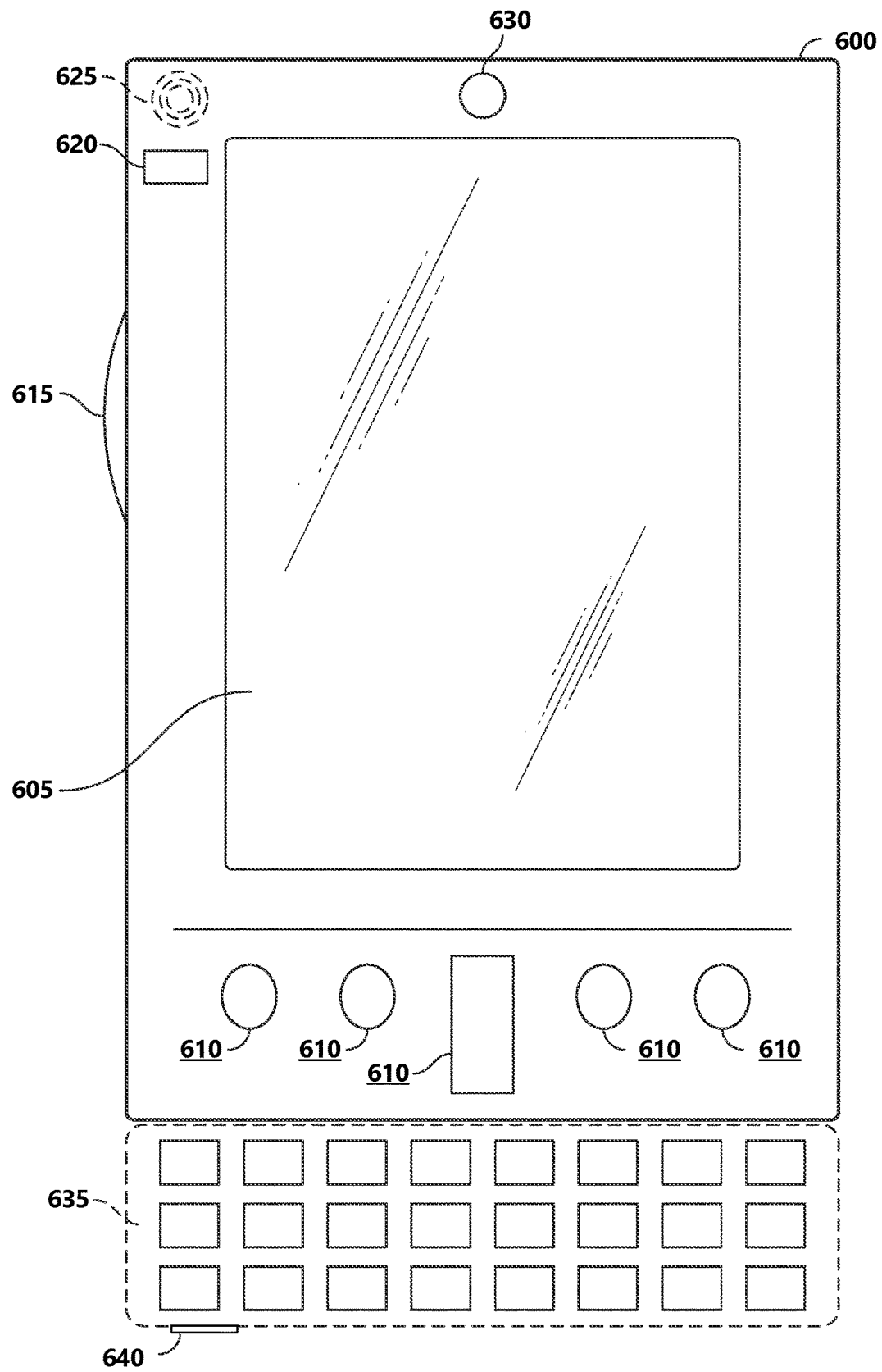
FIGS. 6A and 6B are block diagrams of a mobile computing device.
Figure 6B:
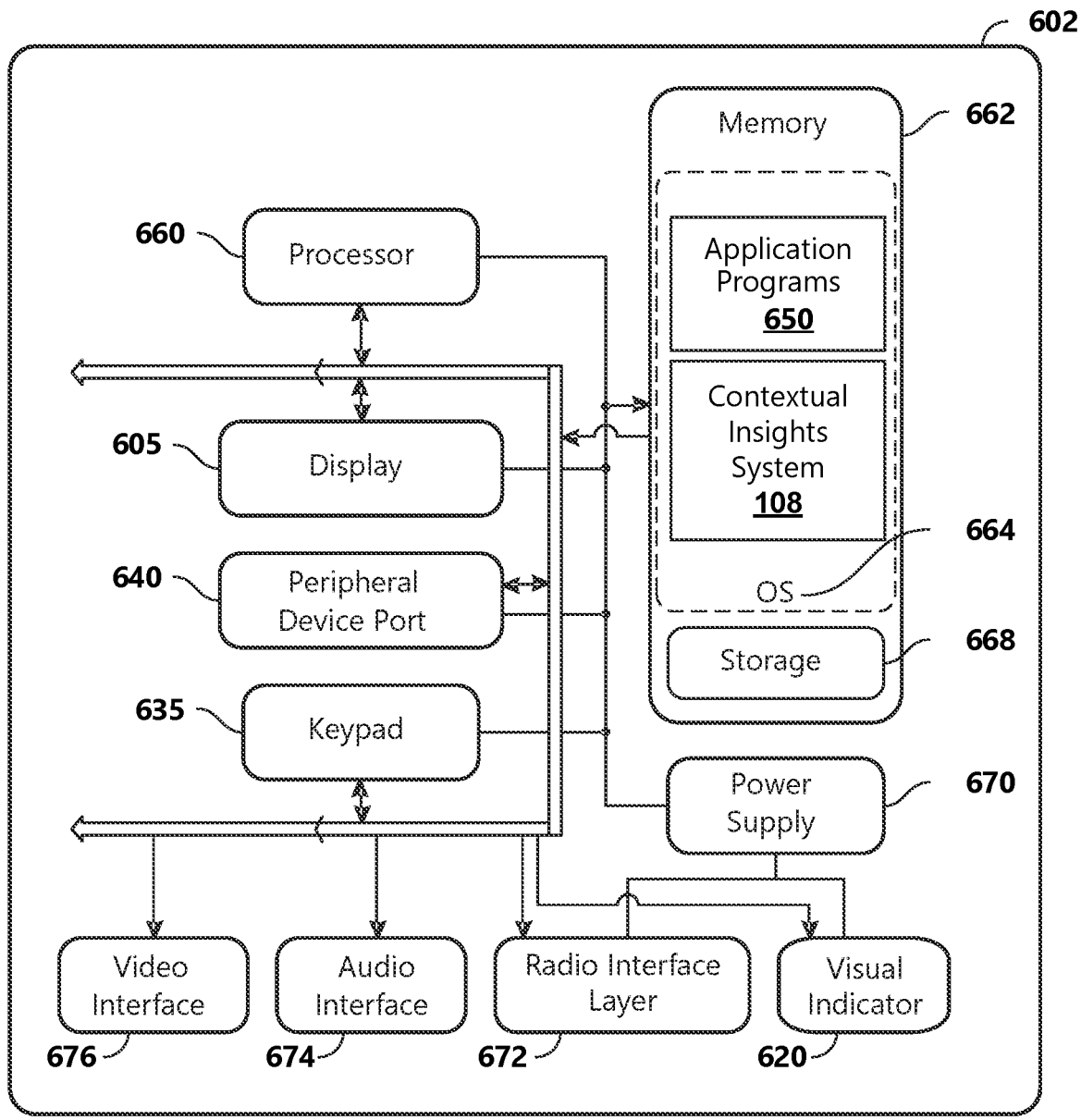
Figure 7:
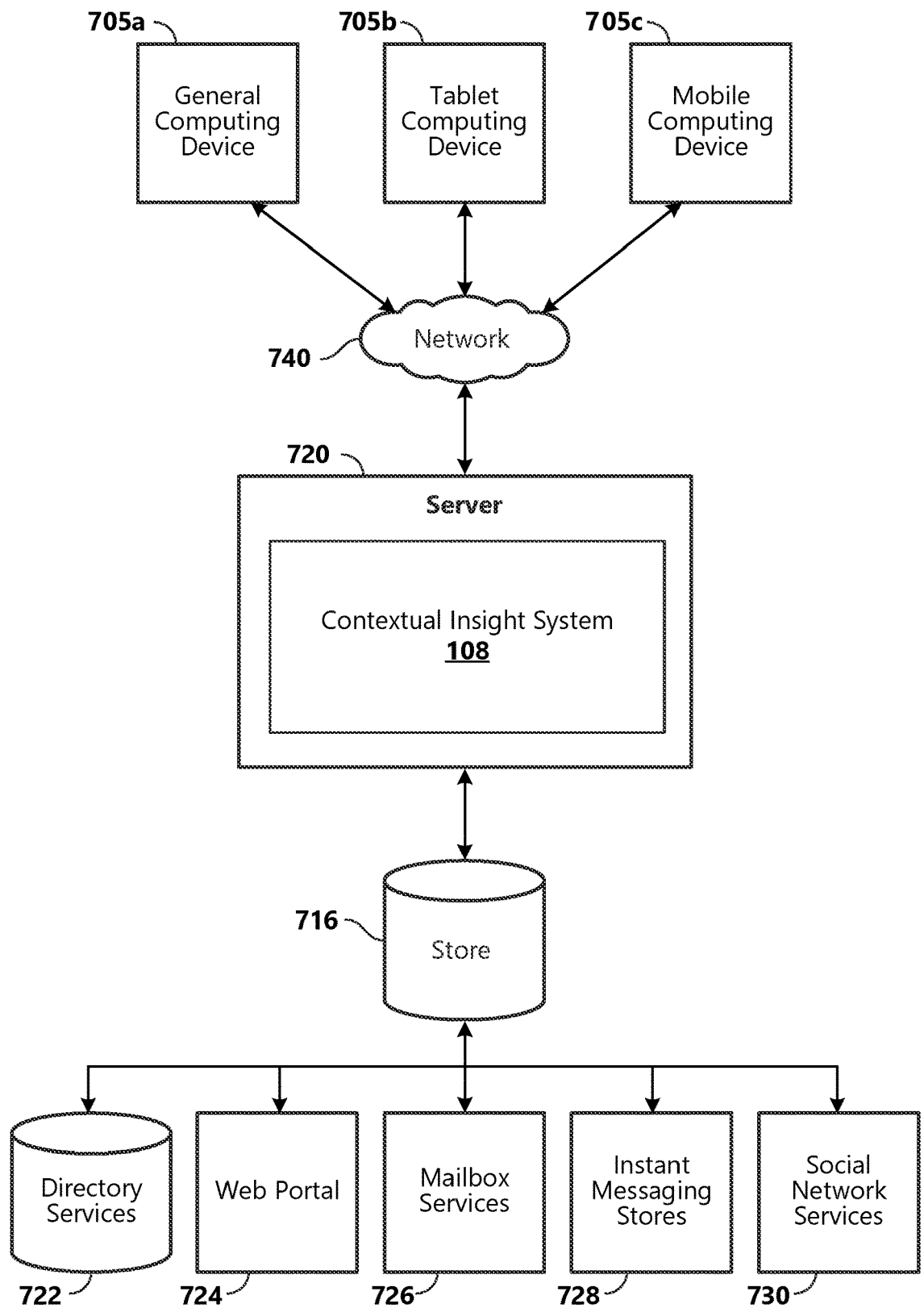
FIG. 7 is a block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes contextual insight system 108. The operating system 505, for example, is suitable for controlling the operation of the computing device 500. Furthermore, aspects are practiced in conjunction with a graphics library, other operating systems, or any other application program, and are not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., contextual insight system 108) perform processes including, but not limited to, one or more of the stages of the method 400 illustrated in FIG. 4. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 5 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or fewer input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, communication clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, contextual insight system 108 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 60 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 are stored locally on the mobile computing device 600, as described above. According to another aspect, the data are stored on any number of storage media that are accessible by the device via the radio 672 or via a wired connection between the mobile computing device 600 and a separate computing device associated with the mobile computing device 600, for example, a server computer in a distributed computing network, such as the Internet. As should be appreciated such data/information are accessible via the mobile computing device 600 via the radio 672 or via a distributed computing network. Similarly, according to an aspect, such data/information are readily transferred between computing devices for storage and use according to well-known data/information transfer and storage means, including electronic mail and collaborative data/information sharing systems.

FIG. 7 illustrates one example of the architecture of a system for providing contextual insights as described above. Content developed, interacted with, or edited in association with the contextual insight system 108 is enabled to be stored in different communication channels or other storage types. For example, various documents may be stored using a directory service 722, a web portal 724, a mailbox service 726, an instant messaging store 728, or a social networking site 730. The contextual insight system 108 is operative to use any of these types of systems or the like for providing contextual insights, as described herein. According to an aspect, a server 720 provides the contextual insight system 108 to clients 705 *a,b,c*. As one example, the server 720 is a web server providing the contextual insight system 108 over the web. The server 720 provides the contextual insight system 108 over the web to clients 705 through a network 740. By way of example, the client computing device is implemented and embodied in a personal computer 705*a*, a tablet computing device 705*b* or a mobile computing device 705*c* (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A system comprising:
a processing unit; and
a memory coupled to the processing unit and storing instructions that, when executed by the processing unit, cause the system to be operable to:
receive, as part of a conversation including a user and an agent at a communication application, a request from the user that triggers an identification of information relating to a topic of the request;
extract keywords from the request that identify the topic of the request;
query, with a first query using the keywords as input, a first subset of resources that include a collection of users to identify candidate users from the collection of users that are one or more of knowledgeable about the topic and included within the request;
query, with a second query using the keywords and the candidate users identified from the first query as input, a second subset of resources that manage a collection of content items to identify candidate content items from the collection of content items that are associated with the topic and with which the candidate users have interacted; and
provide the candidate users and the candidate content items to the communication application for presentation as results to the request from the agent within the conversation.

2. The system of claim 1, wherein the instructions, that when executed by the processing unit, further cause the system to be operable to:
capture context data associated with the user by at least one of:
monitoring a plurality of communications at the communication application in which the user is a participant; and
identifying an intent of the user associated with the request.

3. The system of claim 2, wherein the instructions, that when executed by the processing unit, further cause the system to be operable to:
refine the candidate users and the candidate content items provided to the communication application based on the context data associated with the user.

4. The system of claim 2, wherein the context data includes static context data associated with participants of the plurality of communications and dynamic context data associated with subject matter of the plurality of communications.

5. The system of claim 4, wherein the static context data includes data about the participants that does not change during the plurality of communications.

6. The system of claim 4, wherein the dynamic context data associated with the subject matter of the plurality of communications relates to information about topics and users from the collection of users discussed during the plurality of communications.

7. The system of claim 2, wherein if the keywords extracted from the request have two or more meanings, the instructions, when executed by the processing unit, cause the system to be further operable to:
identify, using the context data, one of the two or more meanings intended by the user.

8. The system of claim 1, wherein the first subset of resources that include the collection of users include one or more of an enterprise directory, a social network, or a relational graph.

9. The system of claim 1, wherein the second subset of resources that manage the collection of content items include one or more of a document database, a document management system, an information management index, or a repository service.

10. The system of claim 1, wherein the first subset and the second subset of resources are embodied in a relational graph comprising user nodes for the collection of users, content item nodes for the collection of content items, and edges between each of the user nodes and one or more of the content item nodes to represent authorship, modification, or a view of a content item corresponding to the content item node by a respective user corresponding to the user node.

11. The system of claim 1, wherein the instructions that, when executed by the processing unit, further cause the system to be operable to:
authenticate access of the user to the first subset and second subset of resources via an authentication process.

12. The system of claim 1, wherein the user is associated with a company and at least a portion of the first subset and second subset of resources are company resources.

13. The system of claim 1, wherein the instructions that, when executed by the processing unit, further cause the system to be operable to:
receive, as part of the conversation including the user and the agent at the communication application, another request from the user for additional information about one or more of the candidate users and the candidate content items provided as results;
query one or more of the first subset and the second subset of resources to respectively retrieve the additional information about the one or more of the candidate users and the candidate content items; and
provide the additional information to the communication application for presentation as results to the another request from the agent within the conversation.

14. A method for identifying information relating to a topic of a request, the method comprising;
receiving, as part of a conversation including a user and an agent at a communication application, a request from the user that triggers an identification of information relating to a topic of the request;
extracting keywords from the request that identify the topic of the request;
querying, with a first query using the keywords as input, a first subset of resources that include a collection of users to identify candidate users from the collection of users that are one or more of knowledgeable about the topic and included within the request;
querying, with a second query using the keywords and the candidate users identified from the first query as input, a second subset of resources that manage a collection of content items to identify candidate content items from the collection of content items that are associated with the topic and with which the candidate users have interacted; and providing the candidate users and the candidate content items to the communication application for presentation as results to the request from the agent within the conversation.

15. The method of claim 14, further comprising refining the candidate users and the candidate content items provided to the communication application based on context data associated with the user.

16. The method of claim 15, further comprising capturing the context data associated with the user by at least one of:
monitoring a plurality of communications at the communication application in which the user is a participant; and
identifying an intent of the user associated with the request.

17. The method of claim 14, further comprising:
authenticating access of the user to the first subset and second subset of resources via an authentication process, wherein the user is associated with a company and at least a portion of the first subset and second subset of resources are company resources.

18. Computer storage media including instructions that, when executed by a processing unit, causes a method for identifying information relating to a topic of a request to be performed, the method comprising:

receiving a request from a user that triggers an identification of information relating to a topic of the request;
extracting keywords from the request that identify the topic of the request;
querying, with a first query using the keywords as input, a first subset of resources that include a collection of users to identify candidate users from the collection of users that are one or more of knowledgeable about the topic and included within the request;
querying, with a second query using the keywords and the candidate users identified from the first query as input, a second subset of resources that manage a collection of content items to identify candidate content items from the collection of content items that are associated with the topic and with which the candidate users have interacted; and
providing the candidate users and the candidate content items as results to the request.

19. The computer storage media of claim 18, wherein the request is received as part of a conversation including the user and an agent at a communication application, and the candidate users and the candidate content items are provided to the communication application for presentation as the results to the request from the agent within the conversation.

20. The computer storage media of claim 18, further comprising refining the candidate users and the candidate content items provided as results based on context data associated with the user.

\* \* \* \* \*